United States Patent

Liu et al.

(10) Patent No.: US 7,623,120 B2
(45) Date of Patent: Nov. 24, 2009

(54) WIRELESS AND PASSIVE TABLET FOR INPUTTING TO COMPUTER

(75) Inventors: Yingjian Liu, Beijing (CN); Honggang Wang, Beijing (CN); Liang Zhao, Beijing (CN)

(73) Assignee: Hanwang Technology Co., Ltd., Beijing (CN)

( * ) Notice: Subject to any disclaimer, the term of this patent is extended or adjusted under 35 U.S.C. 154(b) by 112 days.

(21) Appl. No.: 10/506,467

(22) PCT Filed: Apr. 18, 2003

(86) PCT No.: PCT/CN03/00284

§ 371 (c)(1),
(2), (4) Date: Aug. 11, 2005

(87) PCT Pub. No.: WO03/090057

PCT Pub. Date: Oct. 30, 2003

(65) Prior Publication Data

US 2006/0007164 A1    Jan. 12, 2006

(30) Foreign Application Priority Data

Apr. 22, 2002   (CN) ............................... 02 1 17257

(51) Int. Cl.
*G06F 3/045* (2006.01)
(52) U.S. Cl. .................... 345/174; 178/18.07
(58) Field of Classification Search .................. 345/173
See application file for complete search history.

(56) References Cited

U.S. PATENT DOCUMENTS

| | | | |
|---|---|---|---|
| 4,609,776 A | | 9/1986 | Murakami et al. |
| 5,557,076 A | * | 9/1996 | Wieczorek et al. ........ 178/18.03 |
| 5,646,377 A | * | 7/1997 | Oda .......................... 178/18.07 |
| 6,184,864 B1 | | 2/2001 | Chao |
| 6,476,799 B1 | * | 11/2002 | Lee et al. ..................... 345/174 |
| 2002/0056577 A1 | * | 5/2002 | Kaye et al. ................ 178/18.03 |

FOREIGN PATENT DOCUMENTS

CN         2487024 Y         4/2002

* cited by examiner

*Primary Examiner*—Amr Awad
*Assistant Examiner*—Yong Sim
(74) *Attorney, Agent, or Firm*—Greenberg Traurig, LLP (57) ABSTRACT

This invention refers to peripheral equipment of a computer and is a wireless and passive tablet for inputting to the computer that converts the track of handwriting to digital X, Y coordinates and then inputs it to the computer and then displays the track on screen of the computer. The characteristic of the wireless and passive tablet is using the coil of X, Y direction in transmitting and receiving. A square wave is generated and input to a transmitting circuit. A transmitted electromagnetic wave is inputted to a circuit of a pen to form resonance that will be outputted to a receiving circuit. The receiving circuit connects to an amplifying circuit to amplify the signal and input the amplified signal into a phase angle detecting circuit and an amplitude detecting circuit respectively to control the phase angle and amplitude. And then the signal is inputted to a primary CPU to realize the writing function of the wireless pen.

7 Claims, 5 Drawing Sheets

WIRELESS AND PASSIVE TABLET FOR INPUTTING TO COMPUTER

FIELD OF THE INVENTION

This invention relates to a peripheral equipment of a computer. A main function of the apparatus according to the present invention is to convert tracks of handwriting to digital values, that is, X and Y coordinates and then input them into a computer. With the help of corresponding driver programs and applications, it can display tracks that a user draws on the tablet directly on the screen of computer. The tablet is primarily applied in the fields of handwriting identification system and drawing.

DESCRIPTION OF THE PRIOR ART

Figure 3:
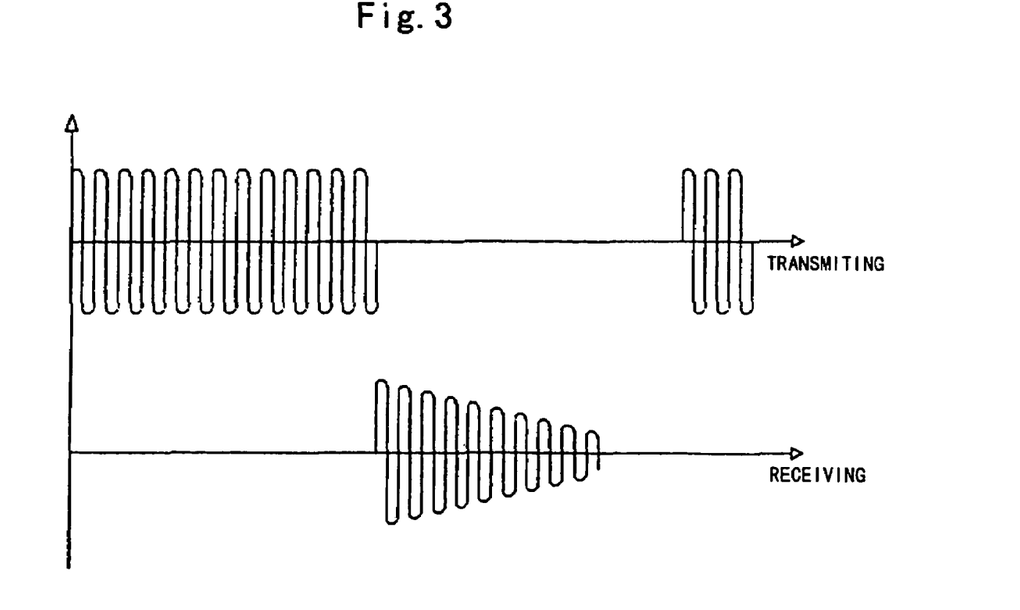
FIG. 3 shows waveforms of the resonance's decaying oscillation of the WACOM tablet.

By far, there are several tablet hardware manufacturers such as the WACOM in Japan, the AIPTEK in Taiwan and the HanWang Technology Co., Ltd. in China. After several years of development, the tablet technique has been on the way to be matured. And more tablet products have come into the world and are on hot sale, such as wired tablet, wireless tablet, wired pressure-sensitive tablet, wireless pressure-sensitive tablet and the like. By principle, all these tablets may be divided into such kinds as the electromagnetic one, the touchable one, the ultrasonic-localizing one, the photoelectric one and so on. Till now, the WACOM Company in Japan is the major in manufacturing wireless and passive tablets in the industrial circles. The patents of WACOM's tablet have following two features: one is that the transmitting coil and the receiving coil are just the same one; the other is that it first emits an electromagnetic wave with the same frequency as a resonance frequency of a pen circuit for a period of time so as to resonate the inductor and capacitors in the pen circuit, then it stops emitting and switches to a receiving state, and thereafter the oscillation of resonant wave in the pen circuit will be attenuated, for there is no outer impetus to the inductors and capacitors in the pen circuit. The procedure above described is illustrated in FIG. 3. Now a signal is extracted out through an amplifying and filtering circuit to finally determine the coordinate values of X and Y.

SUMMARY OF THE INVENTION

Figure 1:
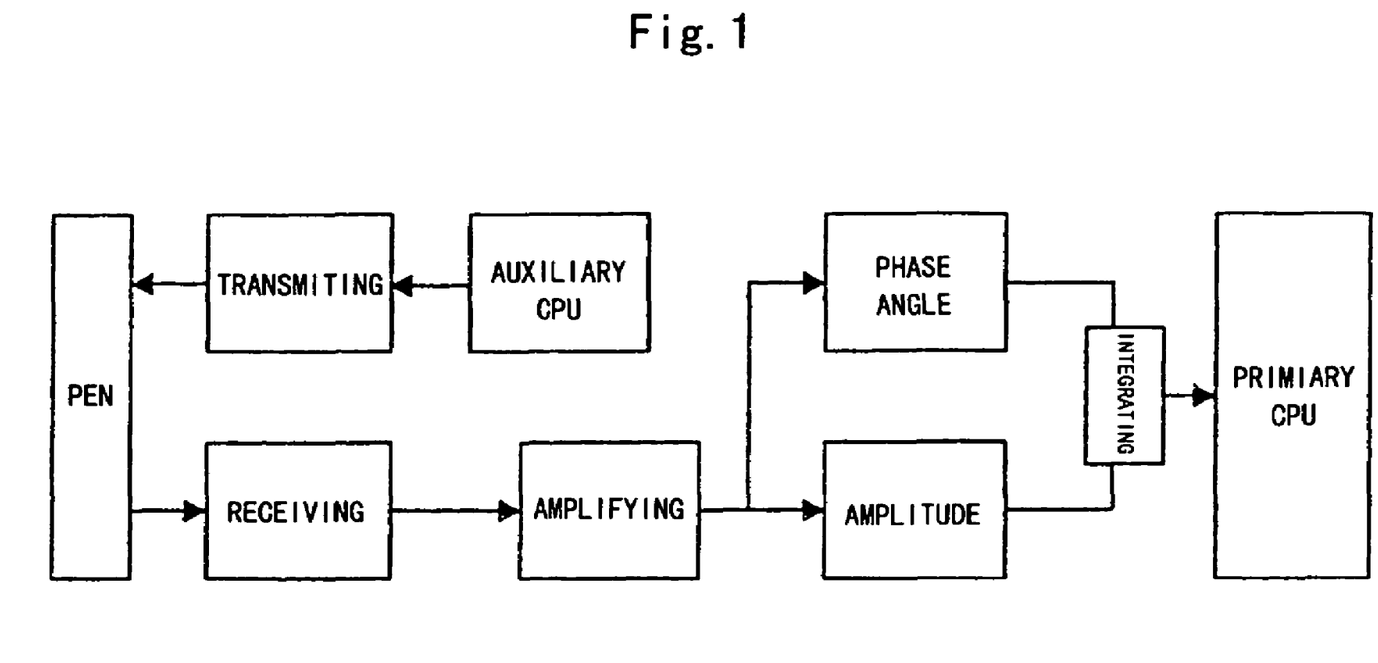
FIG. 1 is a system block diagram of a wireless and passive tableting apparatus for inputting to computer.
Figure 2:
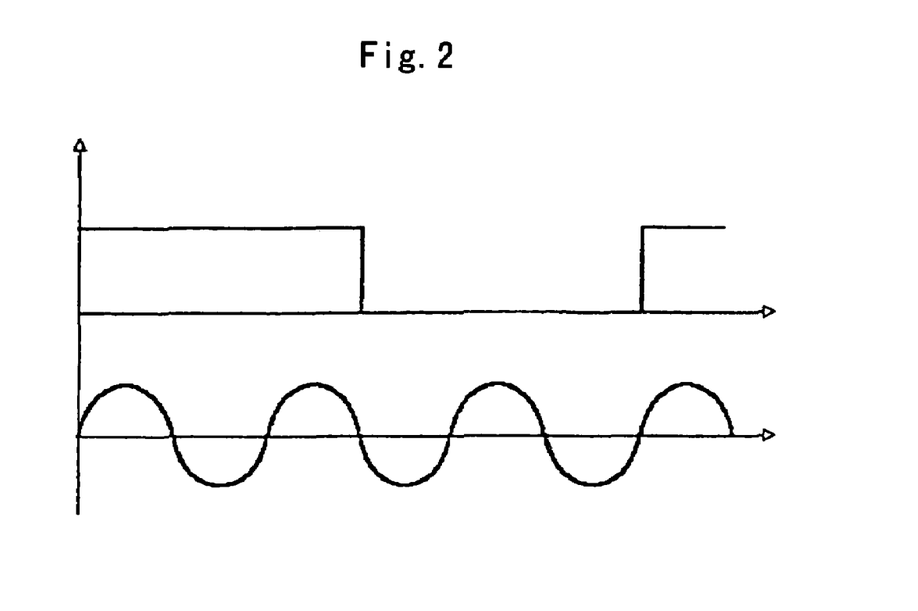
FIG. 2 shows waveforms transmitted electromagnetic wave according to the present invention.

The present invention is such a wireless and passive pressure-sensitive tableting apparatus. Wherein the term "wireless" means that nothing wires a pen and a tablet. And the term "passive" means that no battery is in the pen. And the term "pressure-sensitive" means that the tablet could sense the pen's pressure. The principal points of technique adopted in the present invention to determine the coordinate values of X and Y and to sense the pen's pressure are illustrated in FIG. 1: wherein auxiliary CPU (MCU2) generates a square wave and inputs it to a transmitting circuit, the transmitted electromagnetic wave is inputted to a pen circuit to form resonance, then output to a receiving circuit and amplified by an amplifying circuit, which is connected with an output of the receiving circuit, then the resultant signal is input to a phase angle and an amplitude detecting circuit to conduct phase angle detection and amplitude detection. After an integrating circuit, a signal is input to primary CPU. Thus, the function of inputting to the computer with a wireless passive pen has been realized. The operating process is as follows: a square wave, generated by the auxiliary CPU (MCU2), is inputted to a transmitting circuit. An electromagnetic wave, whose waveform is shown in FIG. 2, is transmitted continuously through the coils of Y direction. By Fourier Transform, it is known that the square wave has higher harmonics with the frequencies of odd times of its own. And the resonance frequency determined by the inductors and capacitors of the pen is just a certain odd times of the square wave's frequency. Therefore, once the pen's resonant coil is induced by the higher harmonics of the square wave of the tablet's coil, it will resonate; and once a resonance signal is received by the coil of X direction of the receiving circuit, it will be amplified by the amplifying circuit and then input to the phase angle and amplitude detecting circuit, where the signal's are divided into I phase and J phase. Finally, inputting the signals with I phase and signals with J phase into the CPU via the integrating circuit. The primary CPU calculates the amplitude and phase angle, wherein the amplitude corresponding to the coordinate values of X and Y, and the phase angle being direct proportion to the pen's pressure. When the pen tip is pressed down, the pen's resonance phase deviates because of variation of the inductance in the pen. Therefore, current pressure from the pen can be obtained by measuring the very phase angle.

Differing from the tablet of WACOM Company, the present invention accomplishes its signal transmitting and receiving through the coils of direction Y and X respectively. Besides this, transmitting and receiving procedures of the present invention are conducted continuously, but not in an alternative way as the tablet of WACOM Company do.

DETAILED DESCRIPTION OF THE PREFERRED EMBODIMENTS

Hereinafter, the invention will be described in conjunction with the preferred embodiments and drawings.

FIG. 1 shows a block diagram of the system according to the present invention. An auxiliary CPU, which generates a square wave, connects with a transmitting circuit, which can transmit electromagnetic wave continuously. A pen circuit receives the electromagnetic wave transmitted from the transmitting circuit to produce a resonant signal. Then the resonant signal is transmitted to receiving circuit continuously, and amplified by an amplifying circuit that connects with the receiving circuit. The amplified signals is inputted into an phase angle and amplitude detecting circuit, and the signals output from the phase angle and amplitude detecting circuit are inputted into a primary CPU via and integrating circuit.

A waveform of a transmitted electromagnetic wave according to the present invention is shown in FIG. 2, wherein its cycle is of odd times of a resonance cycle determined by the inductors and capacitors in the pen.

Figure 4:
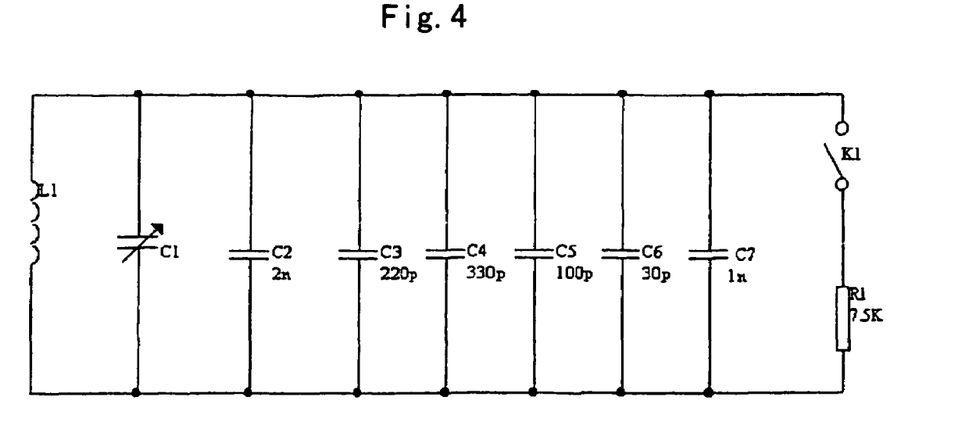
FIG. 4 is a transmitting circuit and receiving circuit according to the present invention.

The transmitting circuit and receiving circuit of the present invention are illustrated in FIG. 4, wherein the part in the direction of Y is a continuous transmitting circuit. By sequentially gating the transmitting circuits Y1, Y2 . . . Y18 . . . Y24, and regularly gating the receiving circuits X1, X2 . . . X18 . . . X24 in turn, the position in Y coils can be determined for the pen according to the strength of a received signal, that is, which Y coils the pen locates can be determined. Similarly, by regularly gating the transmitting circuits Y1, Y2 . . . Y18 . . . Y24 in turn, and sequentially gating the receiving circuits X1, X2 . . . X18 . . . X24, which X coils the pen locates can be determined also. Following is the practical connection of the circuit: the transmitting circuits are in the direction of Y and the receiving circuits are in the direction of X. L10, L11, L12, L13, L14 and L15 stand for chips, among which L13, L14 and L15 are adopted for transmitting signals and L10, L11 and L12 are adopted for receiving signals. A square wave signal, generated by an auxiliary CPU (MCU2), is inputted into pin 3 (X port) of chips L13, L14 and L15 respectively via the RX+ terminals of the transmitting circuit shown in FIG. 5. For chip L13, its X0~X7 ports corresponding to pins 13, 14, 15, 12, 1, 5, 2 and 4 connect with the the coils in the direction of Y respectively, the output terminals of the coils are grounded; INH terminal corresponding to pin 6 is used for chip selection; A terminal, B terminal and C terminal corresponding to pins 11, 10 and 9 are gating terminals, all connecting with the primary CPU; VEE terminal corresponding to pin 7 is connected to a negative voltage. For chip L14, its X0~X7 ports corresponding to pins 13, 14, 15, 12, 1, 5, 2 and 4 connect with the coils in the direction of Y respectively, the output terminals the coils are grounded; INH terminal corresponding to pin 6 is used for chip selection; A terminal, B terminal and C terminal corresponding to pins 11, 10 and 9 are gating terminals, all connecting with the primary CPU; VEE terminal corresponding to pin 7 is connected to a negative voltage. And for L15, its X0~X7 ports corresponding to pins 13, 14, 15, 12, 1, 5, 2 and 4 connect with the coils in the direction of Y respectively, the output terminals of the coils are grounded; INH terminal corresponding to pin 6 is used for chip election; A terminal, B terminal and C terminal corresponding to pins 11, 10 and 9 are gating terminals, all connecting with the primary CPU; VEE terminal corresponding to pin 7 is connected to a negative voltage. The RX+ terminals of the receiving circuit connect with the pin 3 (X ports) of chip L10, chip L11 and chip L12 to output the received signal into the amplifying circuit. For chip L10, its X0~X7 ports corresponding to pins 13, 14, 15, 12, 1, 5, 2 and 4 connect with the coils in the direction of X respectively, the output terminals of the coils are grounded; INH terminal corresponding to pin 6 is used for chip selection; A terminal, B terminal and C terminal corresponding to pins 11, 10 and 9 are gating terminals, all connecting with the primary CPU; VEE terminal corresponding to pin 7 is connected to a negative voltage. For chip L11, its X0~X7 ports corresponding to pins 13, 14, 15, 1, 5, 2 and 4 connect with the coils in the direction of X respectively, the output terminals of the coils are grounded; INH terminal corresponding to pin 6 is used for chip selection; A terminal, B terminal and C terminal corresponding to pins 11, 10 and 9 are gating terminals, all connecting with the primary CPU; VEE terminal corresponding to pin 7 is connected to a negative voltage. And for L12, its X0~X7 ports corresponding to pins 13, 14, 15, 1, 5, 2 and 4 connect with the coils in the direction of X respectively, the output terminals of the coils are grounded; INH terminal corresponding to pin 6 is used for chip election; A terminal, B terminal and C terminal corresponding to pins 11, 10 and 9 are gating terminals, all connecting with the primary CPU; VEE terminal corresponding to pin 7 is connected to a negative voltage.

Figure 5:
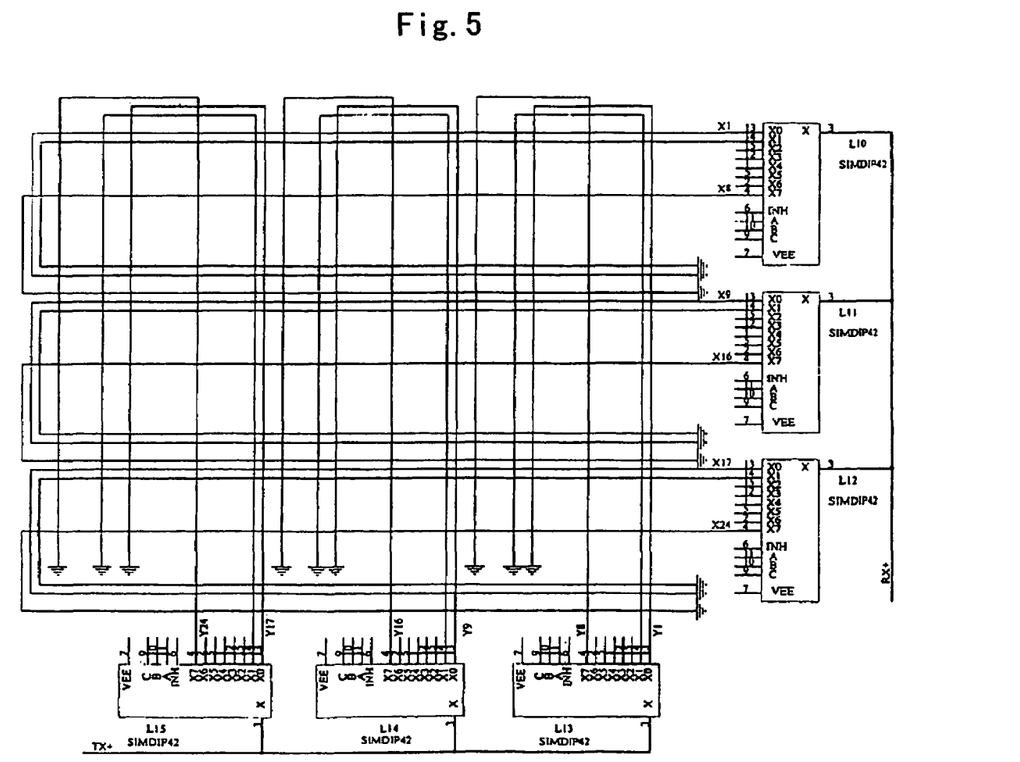
FIG. 5 is an amplifying circuit according to the present invention.

An amplifying circuit according to the present invention is shown in FIG. 5 wherein an AGC (automatic gain control) circuit, controlled by the primary CPU, is used to eliminate the signal's distortion resulted from the variation of the distance between the pen and the tablet. The received signal is coupled into the circuit via RX+ terminal, which connects with ends of two parallel resistors R1 and R2. The other end of the resistor R2 connects with pin 2 of an amplifier IC12A and one end of a resistor R3 in parallel, and the other end of the resistor R3 connects with pin 1 of IC12A, pin 12 of chip IC14 and one end of resistor 6. The pin 4 of the IC12A is connected to analogue ground. The other end of resistor R1 connects with one end of a resistor R4, a capacitor C6 and a reference voltage terminal (Vref) in parallel. The other end of the resistor R4 connects with pin 3 of the chip IC12A. The other end of the capacitor C6 is connected to analogue ground and one end of a capacitor C7. The other end of the capacitor C7 connects with the pin 8 of the chip IC12A and power supply VDD. The other end of the resistor R6 connects with pin 13 of chip IC14 and one end of a resistor R7. The other end of the resistor R7 connects with the pin 14 of chip IC14 and one end of a resistor R8. The other end of the resistor R8 connects with pin 15 of chip IC14 and one end of the resistor R9. The other end of the resistor R9 connects with pin 1 of chip IC14 and one end of a resistor R10. The other end of the resistor R10 connects with pin 2 of chip IC14 and one end of a resistor R11. The other end of the resistor R11 connects with pin 4 of chip IC14 and one end of a resistor R12. The other end of the resistor R12 connects with pin 5 of chip IC14 and one end of a resistor R13. The other end of the resistor R13 connects with a reference voltage terminal (Vref). The pin 3 of chip IC14 connects with one end of a capacitor C1, the other end of the capacitor C1 connects with one end of resistor R16 and the pin 5 of chip IC12B. The other end of the resistor R16 connects with the reference voltage terminal (Vref). The pin 7 of chip IC12B, which outputs the output signals, connects with one end of the resistor R26. The other end of the resistor R26 connects with pin 6 of chip IC12B and one end of a resistor R23. The other end of the resistor R23 connects with the reference voltage terminal (Vref). Pin 11 of chip IC14 connects with a signal GA, and pin 10 of chip IC14 connects with a signal GB and pin 9 of chip IC14 connects with a signal GC, and pin 16 of chip IC14 connects with a power supply VDD and one end of a capacitor C14. The other end of the capacitor C14 connects with the analogue ground, and so do pin 6, pin 7 and pin 8 of chip IC14.

Figure 6:
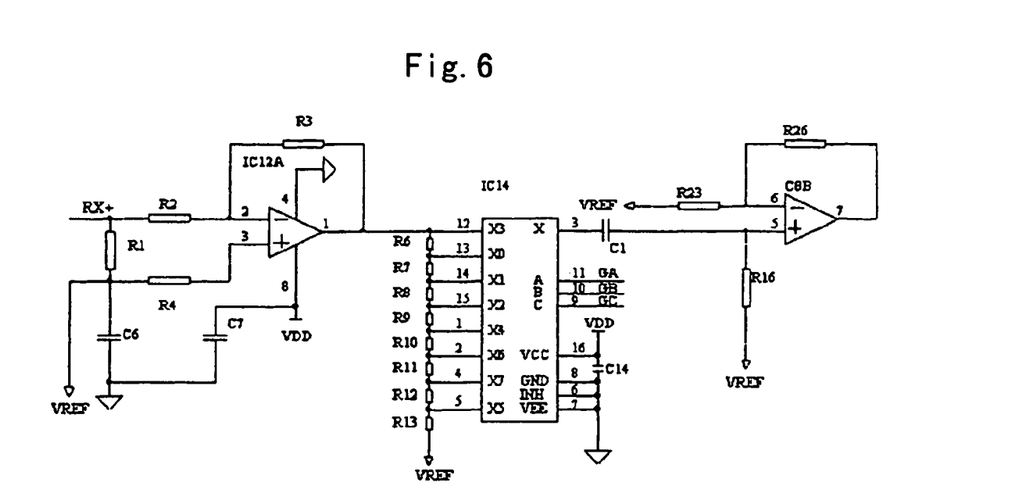
FIG. 6 is a phase angle and amplitude detecting circuit according to the present invention.

The phase angle and amplitude detecting circuit of the present invention is shown in FIG. 6. It is designed to shape the transmitted square wave by eliminating the spikes on the rising edges and on the falling edges. With various of combination of turning ON/OFF of switches IC8B and IC8C, the inputted signals are changed into two set of signals having a phase angle difference of 90 degree, which are defined as I phase and J phase respectively. Specifically, an amplified signal is coupled into the circuit via the IN terminal, which connects with pin 3 of a chip IC9A and one end of a resistor R17 in parallel. The other end of the resistor R17 connects with pin 6 of chip IC9B and one end of a resistor R18 in parallel. The other end of the resistor R18 connects with pin 7 of chip IC9B and pin 4 of chip IC8B in parallel. Pin 5 of chip IC9B connects with one end of a resistor R19. The other end of the resistor R19 connects with a reference voltage. Pin 1 of chip IC9A connects with pin 2 of chip IC9A and pin 8 of chip IC8C. Pin 8 of chip IC9A is connected to a power supply VDD, and pin 4 of chip IC9A connects with an analogue ground. Pin 5 of chip IC8B connects with pin 2 of MCU2. Pin 6 of chip IC8C connects with pin 3 of MCU2. Pin 3 of chip IC8B and pin 9 of chip IC8C are connected together, used as the output terminal to output the detected phase angle and amplitude signals. Pin 11 of MCU2 connects with ends of a capacitor C4 and a resistor R28 respectively, wherein the two other ends of the capacitor C4 and the resistor R28 are connected together to connect with a base of a triode Q1, whose emitter connects with one end of a capacitor C3 in series. The other end of the capacitor C3 connects with one end of a resistor R29 and TX− terminal in parallel. The other end of the resistor R29 connects with power supply VEE. A collector of the triode Q1 connects with TX+ terminal and one end of a capacitor C2 in parallel. And the other end of the capacitor C2 connects with TX− terminal. Pin 5 of MCU2 connects with an OSC clock, and pin 1 of MCU2 connects with ends of a resistor R25 and a capacitor C5 in parallel. The other end of the resistor R25 connects with a power supply VCC, and the other end of the capacitor C5 is grounded. Hang up such pins of MCU2 as pin 4, pin 6, pin 7, pin 8, pin 9, pin 12, pin 13 and pin 14. But let its pin 15 connect with DONE, its pin 16 connect with CMD0, its pin 17 connect with CMD1, its pin 18 connect with CMD2, its pin 19 connect with CMD3, and its pin 20 connect with VCC and one end of a capacitor C19 in parallel. The other end of the capacitor C19 connects with pin 10 of MCU2 and the ground in parallel.

Figure 7:
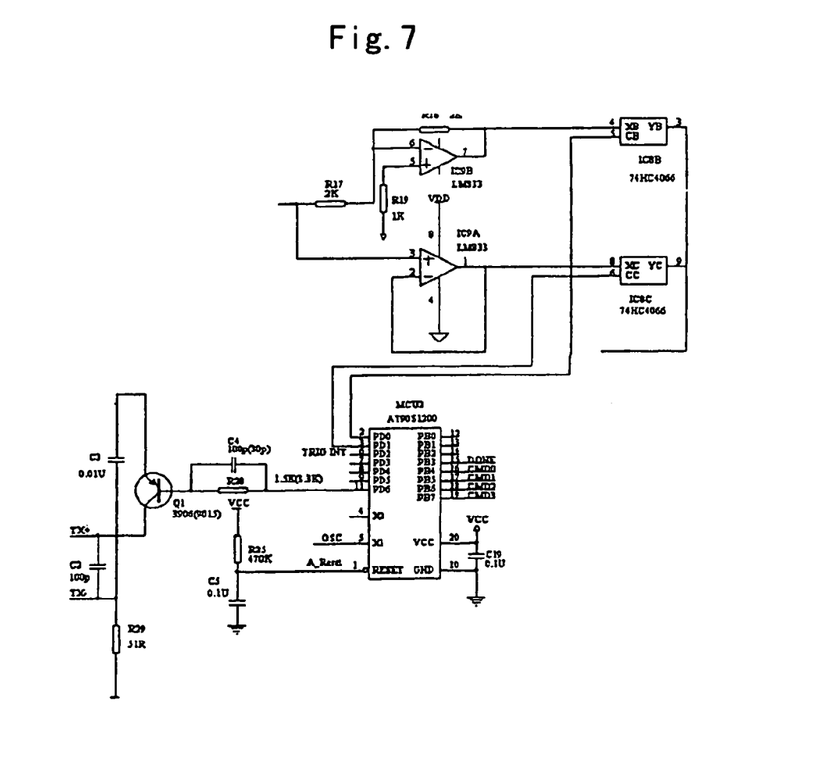
FIG. 7 is an integrating circuit according to the present invention.

The integrating circuit of the present invention is shown in FIG. 7. The IN terminal of the integrating circuit is connected to the OUT terminal. There are two sets of signals having a phase difference of 90 degree, that is, I phase and J phase. Signals with I phase and J phase are inputted into primary CPU via the integrating circuit, and the primary CPU calculates the phase angle and amplitude, wherein the corresponds to the pen's pressure. After shaped by the phase angle and amplitude detecting circuit. a signal is coupled into the integrating circuit via the IN terminal, which connects with one end of a resistor R21 in series. The other end of the resistor R21 connects with pin 2 of chip IC10A, pin 11 of IC8D and one end of a capacitor C21 in parallel. The other end of the capacitor C21 connects with pin 10 of chip IC8D and pin 1 of chip IC10A in parallel. Pin 12 of chip IC8D connects with the primary CPU. And for chip IC10A, its pin 3 connects with the reference voltage, pin 4 connects with the analogue ground, pin 8 connects with the power supply VDD, and pin 1 connects with one end of a resistor R20. The other end of the resistor R20 is used as the output terminal and connected with the primary CPU.

Figure 8:
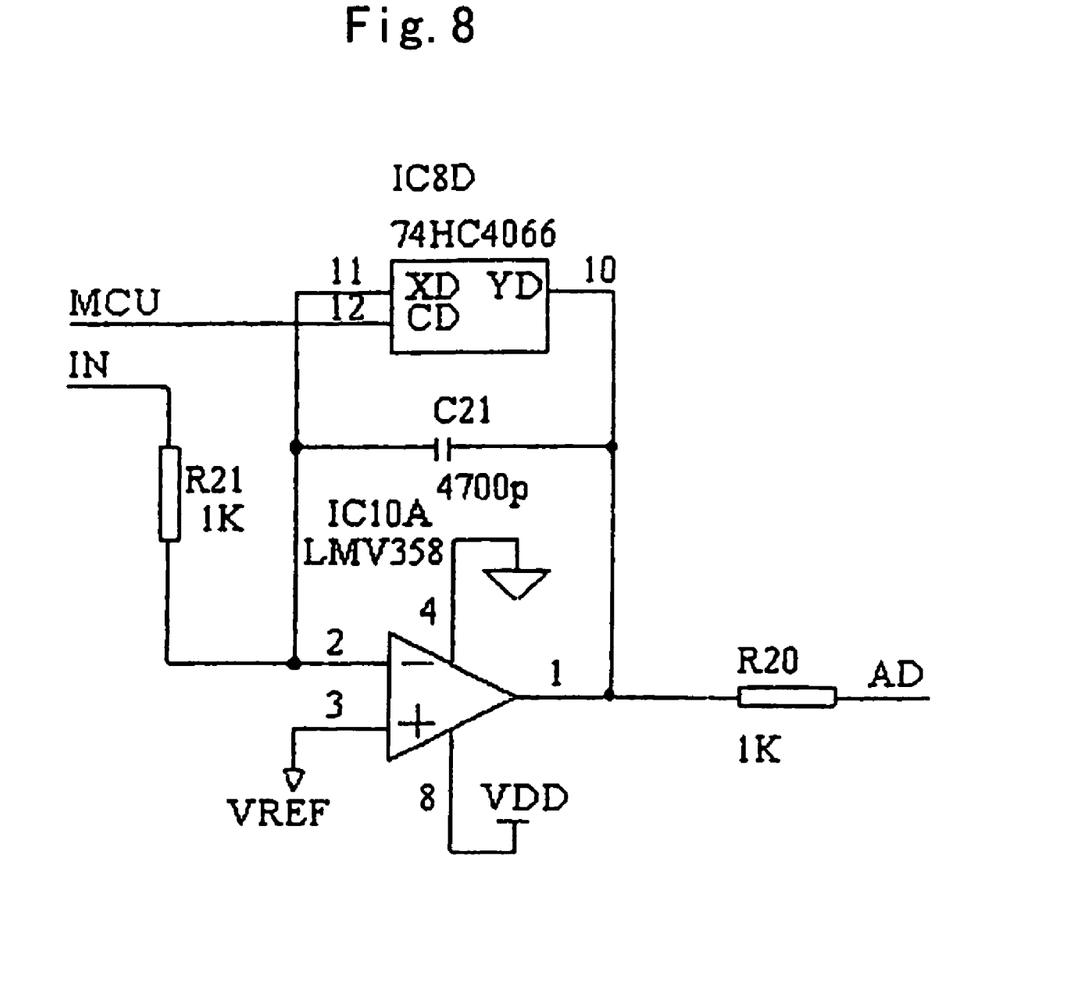
FIG. 8 is a pen's paralleled resonant circuit of the present invention.

The pen circuit primarily comprises a paralleled resonant circuit composed of capacitors and inductors. And the connection relations are illustrated in FIG. 8, wherein an inductor L1 connects with a variable capacitor C1 and the capacitors C2, C3, C4, C5, C6 and C7 in parallel. Then the last two ends of the circuit connect with a switch K1 and a resistor R1 in series respectively, to form a loop. Herein, K1 is a switch on the side of the pen, functioning as the right button of a mouse.

A kind of wireless, passive and pressure-sensitive tableting apparatus is described in the present invention. The resonant circuit in the pen is composed of inductors and capacitors connected in parallel. And the tablet comprises a transmitting circuit, a receiving circuit, an amplifying circuit, a phase angle and amplitude detecting circuit and an integrating circuit. During the process of operation, the user takes hold of the pen to write and draw freely on the tablet with suitable pressure (the switch on the side of the pen acts as the right button of a mouse). With the help of the pen, hardware in the tablet and the corresponding application, the handwriting track that the user made on the tablet just now could be displayed on the computer screen. Thus, the object of inputting handwriting into a computer with the wireless and passive method is well achieved. For instance, once a Chinese word "中" is written on the tablet with the equipped pen, it will be displayed on the computer screen immediately. Thus, the present invention makes it more convenient in computer inputting of Chinese words.

What is claimed is:

1. A wireless and passive tableting apparatus for computer inputting comprising a tablet and a pen, characterized in that
    nothing wires the pen and the tablet and no battery is in the pen;
    the tablet which can sense pressure from the pen comprises
        a transmitting circuit comprising a plurality of coils in a first direction,
        a receiving circuit comprising a plurality of coils in a second direction which is perpendicular to the first direction,
        an amplifying circuit,
        a phase angle and amplitude detecting circuit and
        an integrating circuit; and
    the pen comprises a parallel resonant circuit composed of capacitors and inductors;
    the connection relations between them are as follows:
        an auxiliary CPU, which generates a square wave continuously, connects with the transmitting circuit, which can transmit electromagnetic waves corresponding to the square wave continuously;
        the pen circuit receives the electromagnetic wave transmitted from the transmitting circuit to produce and transmit a resonant signal;
        the frequency of the resonant signal is different from the frequency of the transmitted electromagnetic waves;
        the resonant signal is received by the receiving circuit continuously, and amplified by an amplifying circuit that connects with the receiving circuit;
        the transmission of the electromagnetic waves and the receiving of the resonant signal occur simultaneously;
        the amplified signals are inputted into the phase angle and amplitude detecting circuit, and
        the signals output from the phase angle and amplitude detecting circuit are inputted into a primary CPU via the integrating circuit;
    the connection relations of the amplifying circuit in the tablet are as follows:
    a (RX+) terminal for receiving signals connects with ends of first and second parallel resistors (R1 and R2), the other end of the second resistor (R2) connects with a negative input pin (2) of a first amplifier (IC12A) and one end of a third resistor (R3) in parallel, and the other end of the third resistor (R3) connects with an output pin (1) of the first amplifier (IC12A), a first pin (12) of an amplifying circuit chip (IC14) and one end of a fourth resistor (R6);
    a grounding pin (4) of the first amplifier (IC12A) is connected to analogue ground;
    the other end of the first resistor (R1) connects with one end of a fifth resistor (R4), a first capacitor (C6) and a reference voltage terminal;
    the other end of the fifth resistor (R4) connects with a positive input pin (3) of the first amplifier (IC12A), the other end of the first capacitor (C6) is connected to analogue ground and one end of a second capacitor (C7), the other end of the second capacitor (C7) connects with a power supply connection pin (8) of the first amplifier (IC12A) and a first power supply (VDD);

the other end of the fourth resistor (R6) connects with a second pin (13) of said chip (IC14) and one end of a sixth resistor (R7);

the other end of the sixth resistor (R7) connects with a third pin 14 of said chip (IC14) and one end of a seventh resistor (R8);

the other end of the seventh resistor (R8) connects with a fourth pin (15) of said chip (IC14) and one end of an eighth resistor (R9);

the other end of the eighth resistor (R9) connects with a fifth pin (1) of said chip (IC14) and one end of a ninth resistor (R10);

the other end of the ninth resistor (R10) connects with a sixth pin (2) of said chip (IC14) and one end of a tenth resistor (R11);

the other end of the tenth resistor (R11) connects with a seventh pin (4) of said chip (IC14) and one end of an eleventh resistor (R12);

the other end of the eleventh resistor (R12) connects with an eighth pin (5) of said chip (IC14) and one end of a twelfth resistor (R13);

the other end of the twelfth resistor (R13) connects with a reference voltage terminal;

a ninth pin (3) of said chip (IC14) connects with one end of a third capacitor (C1), the other end of the third capacitor (C1) connects with one end of a thirteenth resistor (R16) and a positive input pin (5) of a second amplifier (IC12B);

the other end of the thirteenth resistor (R16) connects with the reference voltage terminal;

an output pin (7) of the second amplifier IC12B, which outputs the output signals, connects with one end of a fourteenth resistor (R26);

the other end of the fourteenth resistor (R26) connects with a negative input pin (6) of the second amplifier (IC12B) and one end of a fifteenth resistor (R23);

the other end of the fifteenth resistor (R23) connects with the reference voltage terminal;

a tenth pin (11) of said chip (IC14) connects with a first signal connection (GA), and an eleventh pin (10) of said chip (IC14) connects with a second signal connection (GB) and a twelfth pin (9) of said chip (IC14) connects with a third signal connection (GC), and a thirteenth pin (16) of said chip (IC14) connects with the first power supply (VDD) and one end of a fourth capacitor (C14);

the other end of the fourth capacitor (C14) connects with the analogue ground, and a fourteenth pin (6), a fifteenth pin (7) and a sixteenth pin (8) of said chip (IC14) connect with analogue ground.

2. The wireless and passive tableting apparatus of claim 1, wherein the transmitting circuit and receiving circuit comprise chips;

(RX+) terminals of the receiving circuit are connected to pins corresponding to ports of each of a set of chips (L10, L11, L12, L13, L14 and L15);

for a first subset of chips (L10 L11 and L12),
said chips have (X0-X7) ports corresponding to pins (13, 14, 15, 12, 1, 5, 2 and 4) connecting with the coils in the second direction respectively,
the coils have output terminals which are grounded,
said chips have (INH) terminals corresponding to pins (6) used for chip selection,
said chips have terminals (A, B, C) corresponding to pins (11, 10 and 9) which are gating terminals, all connecting with the primary CPU, and
each of said chips has a (VEE) terminal corresponding to a pin (7) connected to a negative voltage;

the square wave generated by the auxiliary CPU is inputted into a pin corresponding to a port of each of a second subset of chips (L13, L14, and L15) via (TX+) terminals of the transmitting circuit; and for the second subset of chips (L13, L14, and L15),
said chips have (X0-X7) ports corresponding to pins (13, 14, 15, 12, 1, 5, 2 and 4) connecting with the coils in the first direction respectively,
the coils have output terminals which are grounded,
said chips have (INH) terminals corresponding to pins (6) used for chip selection,
said chips have terminals (A, B, C) corresponding to pins (11, 10 and 9) which are gating terminals, all connecting with the primary CPU, and
each of said chips has a (VEE) terminal corresponding to a pin (7) connected to a negative voltage.

3. The wireless and passive tableting apparatus of claim 1, wherein, the connection relations of the phase angle and amplitude detecting circuit are as follows:

an input (IN) terminal connects with a positive input pin (3) of a third amplifier (IC9A) and one end of a sixteenth resistor (R17) in parallel, the other end of the sixteenth resistor (R17) connects with a negative input pin (6) of the fourth amplifier (IC9B) and one end of a seventeenth resistor (R18) in parallel, the other end of the seventeenth resistor (R18) connects with an output pin (7) of the fourth amplifier (IC9B) and a first connection pin (4) of a first detecting circuit chip (IC8B) in parallel;

a positive input pin (5) of the fourth amplifier (IC9B) connects with one end of an eighteenth resistor (R19), the other end of the eighteenth resistor (R19) connects with a reference voltage;

an output pin (1) of the third amplifier (IC9A) connects with a negative input pin (2) of the third amplifier (IC9A) and a first connection pin (8) of a second detecting circuit chip (IC8C);

a power supply connection pin (8) of the third amplifier (IC9A) is connected to a first power supply (VDD), and grounding pin (4) of the third amplifier (IC9A) connects with an analogue ground;

a second connection pin (5) of the first detecting circuit chip (IC8B) connects with a first pin (2) of an auxiliary CPU (MCU2);

a second connection pin (6) of the second detecting circuit chip (IC8C) connects with a second pin (3) of the auxiliary CPU (MCU2);

an output pin (3) of the first detecting circuit chip (IC8B) and an output pin (9) of the second detecting circuit chip (IC8C) are connected together, used as an output terminal;

a third pin (11) of the auxiliary CPU (MCU2) connects with ends of a fifth capacitor (C4) and a nineteenth resistor (R28) in parallel, wherein two other ends of the fifth capacitor (C4) and the nineteenth resistor (R28) are connected together to connect with a base of a triode (Q1), whose emitter connects with one end of a sixth capacitor (C3) in series;

the other end of the sixth capacitor (C3) connects with one end of a twentieth resistor (R29) and a first detecting circuit terminal (TX−) in parallel;

the other end of the twentieth resistor (R29) connects with a second power supply (VEE), a collector of the triode (Q1) connects with a second detecting circuit terminal (TX+) and one end of a seventh capacitor (C2) in parallel; and the other end of the seventh capacitor (C2) connects with the first detecting circuit terminal (TX−);

a fourth pin (5) of the auxiliary CPU (MCU2) connects with a clock (OSC), and a fifth pin (1) of the auxiliary CPU (MCU2) connects with ends of a twenty-first resistor (R25) and an eighth capacitor (C5) in parallel;

the other end of the twenty-first resistor (R25) connects with a third power supply (VCC), and the other end of the eighth capacitor (C5) is grounded;

in the auxiliary CPU, a sixth pin (15) connects with a first chip connection (DONE), a seventh pin (16) connects with a second chip connection (CMD0), an eighth pin (17) connects with a third chip connection (CMD1), a ninth pin (18) connects with a fourth chip connection (CMD2), a tenth pin (19) connects with a fifth chip connection (CMD3), and a power supply connection pin (20) connects with the third power supply (VCC) and one end of a ninth capacitor (C19) in parallel;

the other end of the ninth capacitor (C19) connects with a grounding pin (10) of the auxiliary CPU (MCU2) and the ground in parallel.

4. The wireless and passive tableting apparatus of claim 1, wherein the connection relations of said integrating circuit are as follows:

an input terminal (IN) connects with one end of a twenty-second resistor (R21) in series;

the other end of the twenty-second resistor (R21) connects with a negative input pin (2) of a fifth amplifier (IC10A), a first connection pin (11) of an integrating circuit chip (IC8D) and one end of a tenth capacitor (C21) in parallel;

the other end of the tenth capacitor (C21) connects with an output pin (10) of the integrating circuit chip (IC8D) and an output pin (1) of the fifth amplifier (IC10A) in parallel;

a second connection pin (12) of the integrating circuit chip (IC8D) connects with the primary CPU; and in the fifth amplifier (IC10A), a positive input pin (3) connects with a reference voltage, a grounding pin (4) connects with an analogue ground, a power supply connection pin (8) connects with a power supply (VDD), and the output pin (1) connects with one end of a twenty-third resistor (R20), the other end of the twenty-third resistor (R20) is used as an output terminal and connected with the primary CPU.

5. The wireless and passive tableting apparatus of claim 4, wherein, the input terminal of the integrating circuit is connected to an output (OUT) terminal of the phase angle and amplitude detecting circuit, and generates two sets of signals of I phase and J phase having a phase difference of 90 degrees.

6. The wireless and passive tableting apparatus of claim 1, wherein, the connection relations of the parallel resonant circuit in the pen circuit are as follows:

an inductor (L1) connects directly with a variable capacitor (C1) and a plurality of capacitors (C2, C3, C4, C5, C6 and C7) in parallel;

the plurality of capacitors connect directly in parallel with a series combination of a switch (K1) and a resistor (R1), wherein one end of the switch (K1) and one end of the resistor (R1) are directly connected, and the other end of the switch (K1) connects with the other end of the resistor (R1), to form a loop.

7. The wireless and passive tableting apparatus of claim 6, wherein, the switch (K1) of the pen is a switch on the pen, functioning as the right button of a mouse.

\* \* \* \* \*